US008131730B2

(12) United States Patent
Hajela et al.

(10) Patent No.: US 8,131,730 B2
(45) Date of Patent: Mar. 6, 2012

(54) PROCESSOR FOR FAST PHRASE SEARCHING

(75) Inventors: Swapnil Hajela, Fremont, CA (US); Nareshkumar Rajkumar, San Jose, CA (US)

(73) Assignee: SAP America, Inc., Newtown Square, PA (US)

( * ) Notice: Subject to any disclaimer, the term of this patent is extended or adjusted under 35 U.S.C. 154(b) by 430 days.

(21) Appl. No.: 12/414,570

(22) Filed: Mar. 30, 2009

(65) Prior Publication Data

US 2009/0187564 A1   Jul. 23, 2009

Related U.S. Application Data

(63) Continuation of application No. 11/391,889, filed on Mar. 29, 2006, now Pat. No. 7,512,596.

(60) Provisional application No. 60/704,358, filed on Aug. 1, 2005.

(51) Int. Cl.
*G06F 7/00* (2006.01)

(52) U.S. Cl. ........................................ 707/741; 707/742

(58) Field of Classification Search .................. 707/741, 707/742, 759, 700, 705, 706, 736, 999.003–999.005; 715/530

See application file for complete search history.

(56) References Cited

U.S. PATENT DOCUMENTS

| 5,265,065 | A | * | 11/1993 | Turtle | 1/1 |
| 5,418,948 | A | * | 5/1995 | Turtle | 707/700 |
| 5,704,060 | A | | 12/1997 | Del Monte | |
| 5,778,361 | A | * | 7/1998 | Nanjo et al. | 1/1 |
| 6,654,717 | B2 | | 11/2003 | Loofbourrow et al. | |
| 7,149,748 | B1 | * | 12/2006 | Stephan | 707/742 |
| 7,512,596 | B2 | * | 3/2009 | Hajela et al. | 1/1 |
| 2001/0039565 | A1 | | 11/2001 | Gupta | |
| 2001/0044720 | A1 | | 11/2001 | Lee et al. | |
| 2003/0069880 | A1 | * | 4/2003 | Harrison et al. | 707/3 |
| 2004/0230598 | A1 | | 11/2004 | Robertson et al. | |
| 2005/0060651 | A1 | * | 3/2005 | Anderson | 715/530 |
| 2006/0031207 | A1 | * | 2/2006 | Bjarnestam et al. | 707/3 |
| 2007/0067437 | A1 | | 3/2007 | Sindambiwe | |
| 2007/0124475 | A1 | | 5/2007 | Syed et al. | |

FOREIGN PATENT DOCUMENTS

WO   WO-2008119129 A1   10/2008

OTHER PUBLICATIONS

"Fast Phrase Querying With Combined Indexes", ACM Journal Name, vol. V, No. N, Month 200yy, pp. 1-21.*

(Continued)

*Primary Examiner* — Hung T Vy
(74) *Attorney, Agent, or Firm* — Mintz, Levin, Cohn, Ferris, Glovsky & Popeo, P.C.

(57) ABSTRACT

Phrases in a corpus of documents including stopwords are found using a data processor arranged to execute phrase queries. Memory stores an index structure which maps entries in the index structure to documents in the corpus. Entries in the index structure represent words and other entries represent stopwords found in the corpus coalesced with prefixes of respective adjacent words adjacent to the stopwords. The prefixes comprise one or more leading characters of the respective adjacent words. A query processor forms a modified query by substituting a stopword with a search token representing the stopword coalesced with a prefix of the next word in the query. The processor executes the modified query. Also, index structures including coalesced stopwords are created and maintained.

11 Claims, 4 Drawing Sheets

OTHER PUBLICATIONS

Contributors to the Dictionary of Algorithms and Data Structures, NIST, Black, P.E., ed., http://www.nist.gov/dads/Other/contrib.html (1-3) Jun. 27, 2005.

Author(s), "inverted index," Dictionary of Algorithms and Data Structures, NIST, Black, P.E., ed., http://www.nist.gov/dads/HTML/InvertedIndex.html (1-2) Jun. 27, 2005.

Author(s), "prefix," Dictionary of Algorithms and Data Structures, NIST, Black, P.E., ed., http://www.nist.gov/dads/HTML/prefix.html Jun. 27, 2005.

Author(s), "suffix," Dictionary of Algorithms and Data Structures, NIST, Black, P.E., ed., http://www.nist.gov/dads/HTML/prefix.html Jun. 27, 2005.

CRC-A, "suffix array," Dictionary of Algorithms and Data Structures, NIST, Black, P.E., ed., http://www.nist.gov/dads/HTML/suffix.html Jun. 27, 2005.

Williams, H.E. et al., "Fast Phrase Querying With Combined Indexes," ACM Transactions of Information Systems, vol. 22, No. 4, pp. 573-594 Oct. 2004.

"Understanding Query Expressions," Oracle Con Text Option Application Developer's Guide, Re. 3, http://www.lsbu.ac.uk/oracle/oracle7/server/doc/CO20APP/ch03.htm (1-47) Jun. 8, 2005.

Scholer, F. et al., "Fast Phrase Querying With Combined Indexes," presentation by Search Engine Group, RMIT Univ Computer Science.

Williams, H.E. et al., "Fast Phrase Querying With Combined Indexes," presentation by Search Engine Group, RMIT Univ. Computer Science.

Bahle, D. et al., "Efficient Phrase Querying with an Auxiliary Index," School of Computer Science and Information Technology, RMIT Univ., Melbourne, AU, 7 pp., 2001.

Extended European Search Report dated Sep. 21, 2011, issued by the European Patent Office for corresponding European Patent Application No. 10158235.1.

Williams, et al., "Fast Phrase Querying with Combined Indexes", ACM Transactions on Information Systems, vol. 22, No. 4, Oct. 2004.

Bahle, et al., "Efficient Phrase Querying with an Auxiliary Index", Retrieved from the Internet: <URL: http://citeseer.ist.psu/cache/papers/cs/26288/http://zSzzSzwww.cs.rmit.edu.auzSzjzzSzfulltextzStsigirO2bwz.pdf/bahle02efficient.pdf> [retrieved on Mar. 28, 2007].

Williams, et al., "What's Next? Index Structures for Efficient Phrase Querying", Proceedings of the 10th Australasian Database onference, Auckland, New Zealand, Jan. 18, 1999.

Moffat, et al., "Text compression for dynamic document databases", IEEE Transactions on Knowledge and Data Engineering IEEE USA, vol. 9, No. 2, Mar. 1997.

Extended European Search Report dated Oct. 7, 2011, issued by the European Patent Office, for corresponding European Patent Application No. 06788649.9.

Faloutsos, "Access Methods for Text", ACM Computing Surveys, vol. 17, No. 1, Mar. 1, 1985.

Extended European Search Report dated Sep. 29, 2011, issued by the European Patent Office, for corresponding European Patent Application No. 06788499.9.

* cited by examiner

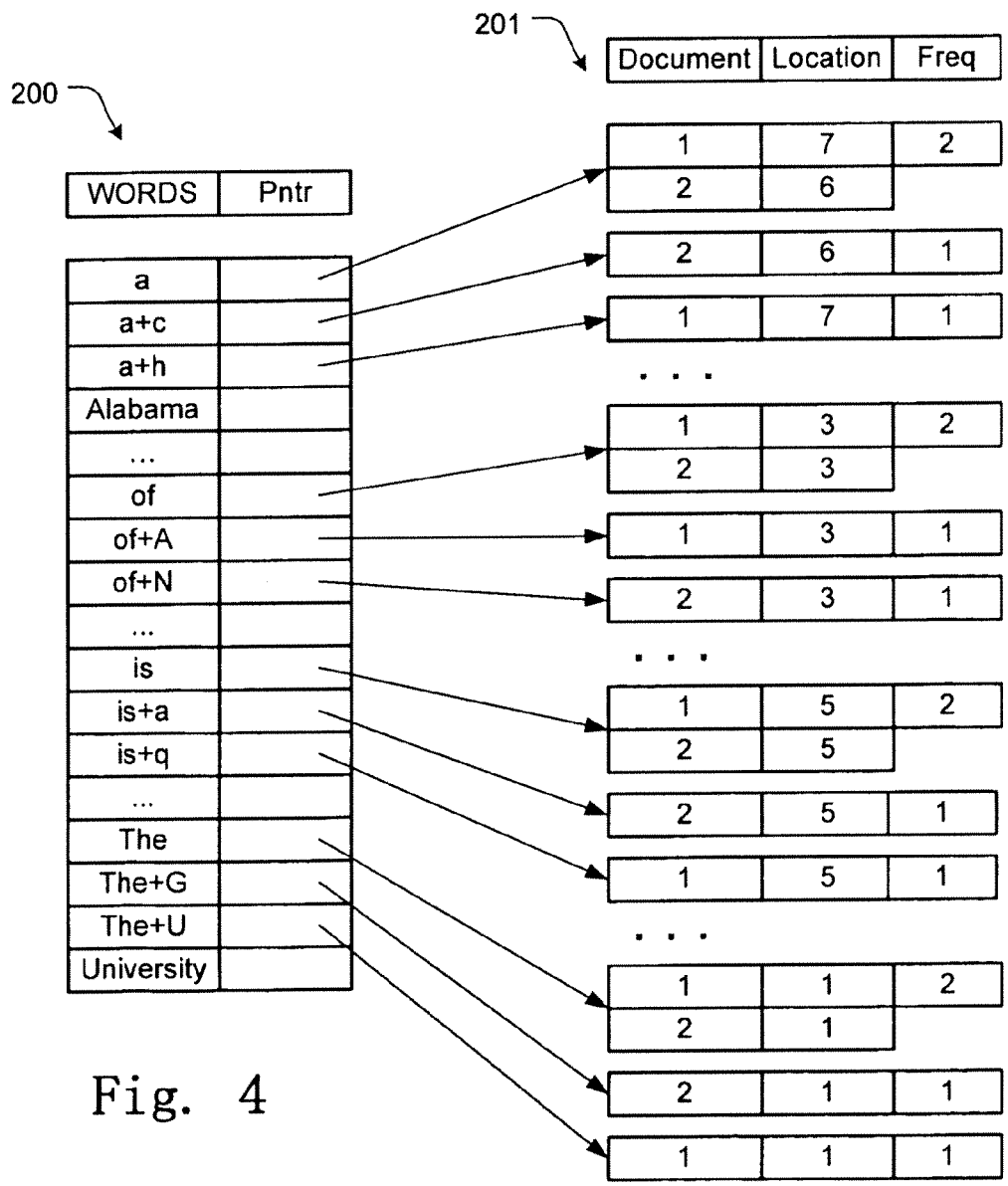

PROCESSOR FOR FAST PHRASE SEARCHING

CROSS-REFERENCE TO RELATED APPLICATIONS

This application is a continuation of U.S. patent application Ser. No. 11/391,889 filed Mar. 29, 2006, now U.S. Pat. No. 7,512,596, which claims the benefit of U.S. Provisional Application No. 60/704,358 filed Aug. 1, 2005, the contents of which are incorporated by reference.

BACKGROUND OF THE INVENTION

1. Field of the Invention

The present invention relates to search engines for handling word and phrase queries over a set of documents.

2. Description of Related Art

Search engines routinely encounter the problem of handling very frequent words, referred to as stopwords. Stopwords like "the", "of", "and", "a", "is", "in" etc., occur so frequently in the corpus of documents subject of a search index that reading and decoding them at query time becomes a very time-consuming operation. Most search engines therefore drop these words during a keyword query and hence the name "stopwords." However, for a search engine to support phrase queries, these stopwords must be evaluated. As an example, consider a phrase query like "University of Georgia". This query must return with documents matching all the three words in the same order. Therefore, the search engine must deal with the stopword "of".

In a survey of web server search logs, it has been found that 20% of all phrase queries contain a frequently occurring word like "the", "to", "of" etc. Thus, solving this issue of phrase query performance is paramount to any search engine.

Performance of such phrase queries presents serious challenges because stopwords occupy a significant percentage of the search index data on disk. This taxes system performance in 3 ways:

- Disk performance on large disk reads from the indexes becomes a serious bottleneck.
- System processor performance in decompressing this data fetched from the indexes gets impacted.
- System memory usage is also increased.

Different methodologies can be used to speed up phrase queries. One method is to use specialized indexes called skiplists that allow selective access of the index postings. This method has the unfortunate side effect of further increasing both the index size and the complexity of the indexing engine.

Another technique that can be used is called "next word indexing". In this technique, words following stopwords are coalesced with the stopword into one word and stored as a separate word in the index. For instance, in the sentence fragment "The Guns of Navarone" in a document, coalescing the stopwords and their subsequent words creates the new words "TheGuns" and "ofNavarone". These words are stored separately in the index. For a phrase query "The Guns of Navarone", the search engine converts the four-word query into a 2-word phrase query "TheGuns ofNavarone". The speed up is enormous here as the number of postings for the word "TheGuns" and "ofNavarone" will be quite small when compared to that for the words "The" and "of".

There is a mechanism of "next-word" indexes (also referred as Combined indexes) published by Hugh E. Williams, Justin Zobel, Dirk Bahle, "Fast Phrase Querying with Combined Indexes," Search Engine Group, School of Computer Science and Information Technology, RMIT University, GPO Box 2476V, Melbourne 3001, Australia. 1999.

This next-word indexing technique, though very interesting, is not preferable because it can increase the number of unique words in the search engine by more than a few million entries. This creates slowdowns both in indexing and querying.

It is desirable to provide systems and methods for speeding up the indexing and querying processes for search engines, and to otherwise make more efficient use of processor resources during indexing and querying large corpora of documents.

SUMMARY OF THE INVENTION

The present invention provides a method and system for stopword coalescing applied for indexing and querying a corpus of documents. Instead of coalescing a stopword and its subsequent word together, technologies described herein apply techniques to coalesce the stopword and a prefix, such as the first letter, of the next word to create a specialized internal token. For example, in the sentence fragment "The Guns of Navarone", the internal tokens for "TheG" and "ofN" are created and stored with the same positional information as the words "The" and "of" within the respective phrases. These tokens are not stored literally as "TheG" but rather in an internal form that disambiguates them from normal words. Now, when the same phrase is entered as a query, the query is modified for searching to the modified phrase "TheG Guns ofN Navarone". The speedup in searching is enormous here as the size of the data for "TheG" and "ofN" is smaller as compared to that of "The" and "of", respectively. The coalesced stopword/prefix indexing described herein results in only a few hundred extra unique words for a typical corpus by current standards, as compared to the millions that are added in a "next-word indexing" concept, and is far simpler to implement than skiplists.

An apparatus for finding phrases in the corpus of documents is described that comprises a data processor arranged to execute queries to find phrases in the corpus of documents, where the words in the corpus of documents include a set of stopwords. Memory readable by the data processor stores an index structure. The index structure maps entries in index structure to documents in the corpus. The entries in the index structure represent words found in the corpus of documents, where the term "word" used herein refers to characters and character strings whether or not they represent a proper word in a linguistic sense, in the corpus of documents, which are indexed by the index structure. In embodiments described herein, the entries represent such words by including tokens that identify the corresponding words. In addition, entries in index structure represent stopwords found in the corpus, by including tokens coalesced with prefixes of respective next words adjacent to the stopwords. The prefixes comprise one or more leading characters of the respective next words. The data processor includes a query processor which forms a modified query by substituting a stopword in the set of stopwords found in a subject phrase with a search token representing the stopword coalesced with a prefix of a next word in the subject phrase. The processor executes the modified query using the index structure, and returns results comprising a list of documents that satisfies the query, and optionally locations within the documents for the phrases that satisfy the query.

In embodiments of the system, the prefixes that are coalesced with a stopword comprise the leading N characters of the next word, where N is three or less. Substantial improvements in performance are achieved where N is equal to one.

Typically, tokens are made using a stopword coalesced with the leading N characters of the next word, where the next word includes more than N characters so that the prefix does not include all of the next word.

Representative embodiments create tokens for the coalesced stopwords by combining code indicating characters in the stopword with code indicating characters in the prefix, and a code indicating that the entry is a coalesced entry that disambiguates the entry from entries representing normal words.

An apparatus for indexing a corpus of documents is described as well, which creates and maintains the index structure described above. Thus, a system comprising a data processor arranged to parse documents in the corpus of documents to identify words found in the documents and locations of words in the documents is described. The processor creates and/or maintains an index structure including entries representing words found in the corpus of documents and mapping entries in index structure to locations in documents in the corpus. The apparatus includes memory storing the index structure that is writable and readable by the data processor. An indexing processor is also included that identifies stopwords in a set of stopwords found in the documents in the corpus. For stopwords that are found in the documents, entries are added to the index structure representing the stopwords, where the entries include tokens coalesced with prefixes of respective next words adjacent to the stopwords, as described herein.

Data processing methods are provided which include storing an index structure, as described above, on a medium readable by a data processor, modifying an input phrase query to form a modified phrase query by substituting a stopword found in a subject phrase with a search token representing the stopword coalesced with the prefix of a next word in the subject phrase, and executing the modified query. Likewise, data processing methods are provided which include parsing documents in the corpus of documents to identify words and locations of words in the documents, and to create entries in an index structure as described herein. The index structure is stored in memory writable and readable by the data processor. Stopwords identified in the set of stopwords are found in the documents in the corpus, and entries are added to the index structure representing the stopwords, by including tokens coalesced with prefixes as described herein.

The technology described herein can also be implemented as an article of manufacture comprising a machine readable data storage medium, storing programs of instructions executable by a processor for performing the data processing functions described herein.

Other aspects and advantages of the present invention can be seen on review of the drawings, the detailed description and the claims, which follow.

BRIEF DESCRIPTION OF THE DRAWINGS

FIG. 2 illustrates an example document.

FIG. 3 illustrates another example document.

FIG. 4 illustrates an index structure with stopwords coalesced with prefixes of next words.

DETAILED DESCRIPTION

A detailed description of embodiments of the present invention is provided with reference to the FIGS. 1-6.

Figure 1:
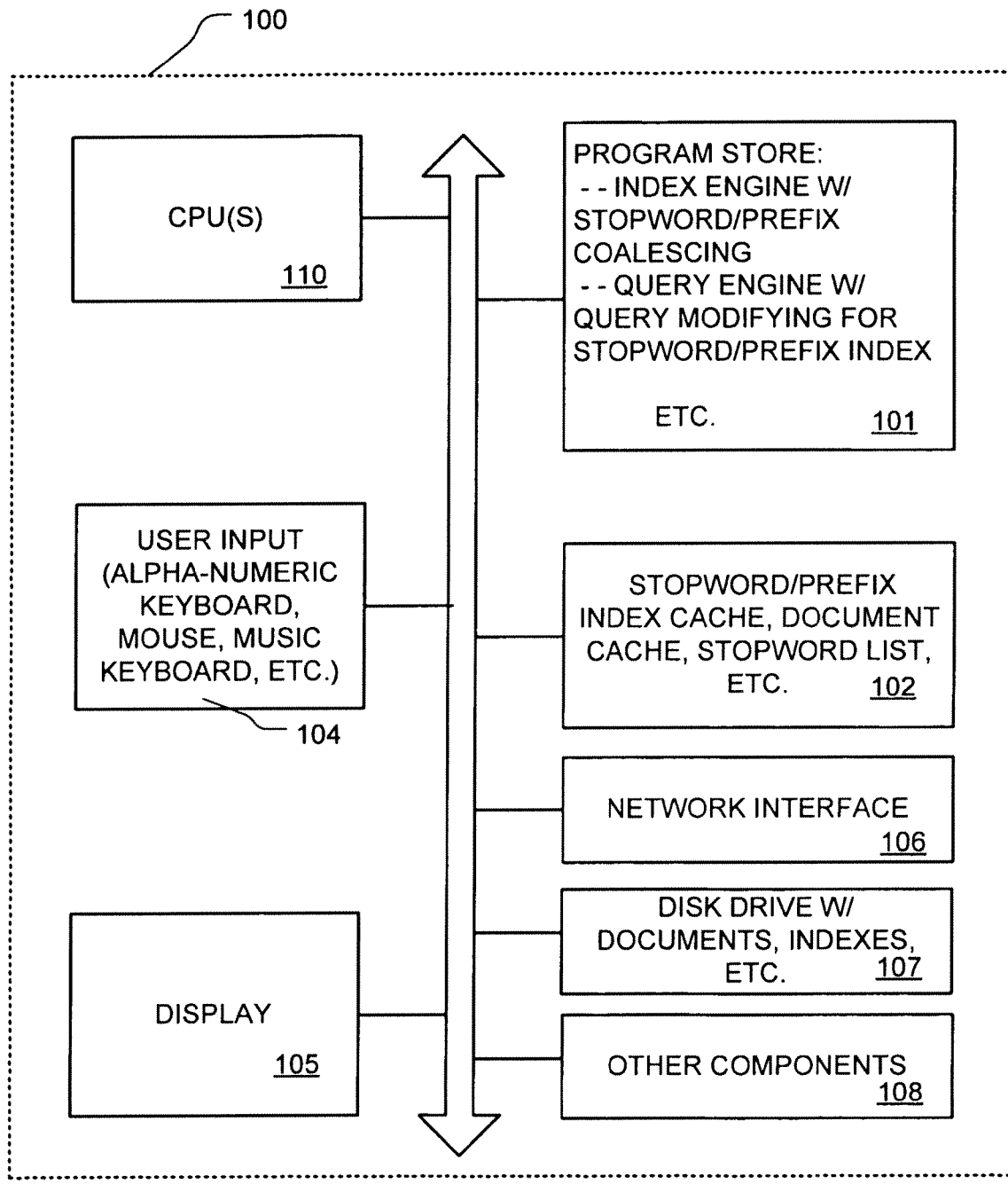
FIG. 1 is a simplified block diagram of a computer system arranged as an apparatus for finding phrases in a corpus of document.

FIG. 1 is a simplified block diagram representing a basic computer system 100 configured as a search engine dedicated to the search and retrieval of information for the purpose of cataloging the results. The search engine includes a document processor for indexing and searching a corpus of documents for finding phrases, including data processing resources and memory storing instructions adapted for execution by the data processing resources. The data processing resources of the computer system 100 include one or more central processing units CPU(s) 110 configured for processing instructions, program store 101, data store 102, user input resources 104, such as an alpha-numeric keyboard, a mouse, and so on, a display 105 supporting graphical user interfaces or other user interaction, a network interface 106, a mass memory device 107, such as a disk drive, or other non-volatile mass memory, and other components 108, well-known in the computer and document processing art. The program store 101 comprises a machine-readable data storage medium, such as random access memory, non-volatile flash memory, magnetic disk drive memory, magnetic tape memory, other data storage media, or combinations of a variety of removable and non-removable storage media. The program store 101 stores computer programs for execution by the CPU(s) 110, configuring the computer system as a search engine. Representative programs include an index processor for generating and maintaining an index structure with entries made by stopword/prefix coalescing and a query processor including resources for modifying queries for use of tokens made by stopword/prefix coalescing for matching with entries in the index structure. The data store 102 comprises a machine-readable data storage medium configured for fast access by the CPU(S) 110, such as dynamic random access memory, static random access memory, or other high speed data storage media, and stores data sets such as stopword lists and data structures such as an index cache and a document cache, utilized by the programs during execution. The mass memory device 107 comprises non-volatile memory such as magnetic disk drives and the like, and stores documents from a corpus of documents, indexes used by the search engine, and the like.

For a corpus of documents, a stopword list is defined, including common words (e.g., prepositions and articles) that usually have little or no meaning by themselves. In the English language examples include "a", "the", "of" etc. Stopword lists may be defined by linguistic analysis independent of a corpus of documents, or alternatively defined by analysis of a corpus of documents to identify the most commonly used words. For electronic documents including tags delineated by special characters such as "<" and ">", a special character or combination of special characters could be treated as a stopword, and included in a stopword list. The size of the stopword list can be adjusted according to the needs and use of a particular search engine.

FIGS. 2-4 illustrate example documents and an index structure comprising a reverse index and dictionary with tokens comprising coalesced stopwords for the example documents.

FIGS. 2 and 3 represent two documents in a corpus for the search engine. Document 1, illustrated in FIG. 2, contains the text "The University of Alabama is quite a huge college" and Document 2, illustrated in FIG. 3, contains the text "The Guns of Navarone is a classic." The superscripts (1-9 in Document 1 and 1-7 in Document 2) indicate the locations of the words in the respective documents.

A corpus of documents for a search engine can comprise a collection of documents represented by a dictionary/index structure. A corpus of documents can include documents stored on a single disk drive, documents accessible by a local network, documents in a library, documents available via a public network, documents received at a search engine from any source, or other collections associated by the index structure of the search engine, or accessible for the purposes of generating such structures. Documents include web pages expressed in languages such as HTML and XML, text files expressed in computer languages such as ASCII, specialized word processor files such as ".doc" files created by Microsoft Word, and other computer readable files that comprise text to be indexed and searched.

FIG. 4 illustrates an index structure comprising a dictionary 200 and a reverse index 201 (also called an inverted index). The dictionary 200 contains entries corresponding with all the unique words and stopwords in the index. The entries including tokens identifying the words and stopwords, where tokens comprise computer readable codes, such as ASCII characters for the letters in the words and stopwords. For stopwords, special tokens are used including computer readable codes for the letters in the stopword, coalesced with a prefix of a next word, and with a disambiguating feature. The entries also include pointers to the locations of the data for the words and stopwords in the inverted index. The dictionary 200 and reverse index 201 are partially filled to simplify the drawing.

For each entry in the dictionary 200, the reverse index 201 contains the document number or numbers identifying documents in the corpus, and the location or locations of words or coalesced stopwords in the corresponding documents. In some embodiments, the index includes a parameter for each entry indicating the frequency of the word in the corpus, or alternatively, a parameter set for each entry indicating the frequency of the word in the corresponding documents.

As can be observed, the stopwords like "a", "the", "is" etc. have more data than the words like "Alabama", "Navarone", etc. which are not members of a stopword list.

The stopwords "a", "is", "the", "of" are processed further for the dictionary and reverse index. In particular, entries are included in the dictionary comprising artificial tokens formed by coalescing the stopwords with a first character, or prefix of length N characters, from the respective next words in the document. In the example, a token is added to the entry for the stopword "a", by using the stopword coalesced with a prefix comprising the first character of respective next words "classic" from Document 2, and "huge" from Document 1. Likewise, the tokens for the stopword "of" are made by coalescing with a prefix comprising a first character of the respective next words "Alabama" from Document 1, and "Navarone" from Document 2. The stopword "is" is coalesced with a prefix comprising a first character of the respective next words "a" from Document 1, and "quite" from Document 2 to make tokens for corresponding entries. The stopword "The" is coalesced with a prefix comprising a first character of the respective next words "Guns" from Document 2, and "University" from Document 1 to make tokens for corresponding entries.

The tokens may comprise the stopword, concatenated with a disambiguating feature, such as a character or character string (for example, a "+" symbol as shown here), concatenated with the prefix of the next word. In other embodiments the disambiguating feature may comprise a string of codes for letters such as for the letters "xxzz", or a string of letters and punctuation such as "x#@Xz".

The length N of the prefix is 1 in a preferred embodiment. In other embodiments, the length N is 2. In yet other embodiments the length N is 3. Further, the length N can be made adaptive, so that it is adapted for different stopwords in the same corpus, or for efficient performance across a particular corpus. It is unlikely that prefixes of length greater than 3 will be required for performance improvements for corpora having sizes expected in the reasonable future. Although embodiments described here apply coalescing with the prefix of a next word, some special characters treated as stopwords, for example, could be coalesced with a prefix of a previous word. For example, a closing character, such as a close quotation mark or a ">" which delineates the end of a tag in some markup languages, might be coalesced with a prefix of a previous word. For example, a tag expressed in a markup language reads "<tag>". The tag is indexed treating the special character "<" as a stopword, with an entry coalescing "<" with the prefix "t" of the next word "tag", and also treating the special character ">" as a stopword, with an entry coalescing ">" with the prefix "t" of the previous word "tag".

If the adjacent word has N or fewer characters, then the entire adjacent word is concatenated with the disambiguating symbol and the first word. Typically, the next word includes more than N characters. Also, if a stopword appears at the end of a sentence or is otherwise hanging, the stopword can be coalesced with the following punctuation (e.g., a period or semi-colon) or with other characterizing data suitable for searching.

As can be seen from this small example, the entries comprising coalesced tokens for stopwords distribute the data for the stopwords and aid in fast querying.

In the illustrated embodiment, the coalesced stopwords are combined with normal words in a single "flat" dictionary with a reverse index for locating words corresponding to the entries in the dictionary in specific documents. Other embodiments include providing one or more additional dictionary/index pairs for the coalesced stopwords, accessed only for phrase queries including stopwords. The index structure can be configured in a wide variety of ways, depending on the corpus being analyzed, the characteristics of searches being used, the memory availability of the search engine, the speed requirements, and so on. In embodiments of the invention, the index structure may comprise a skiplist.

An index processor in the search engine which comprises data sets, such as stopword lists and a cache of documents in a corpus, data structures such as reverse index structures, and computer instructions executable by a processing unit, analyzes a document corpus and generates a dictionary and index such as that illustrated in FIG. 4. The index processor may perform the analysis over a set of documents in one processing session, and may analyze one document, or part of a document, at a time as such document is added to the corpus.

Figure 5:
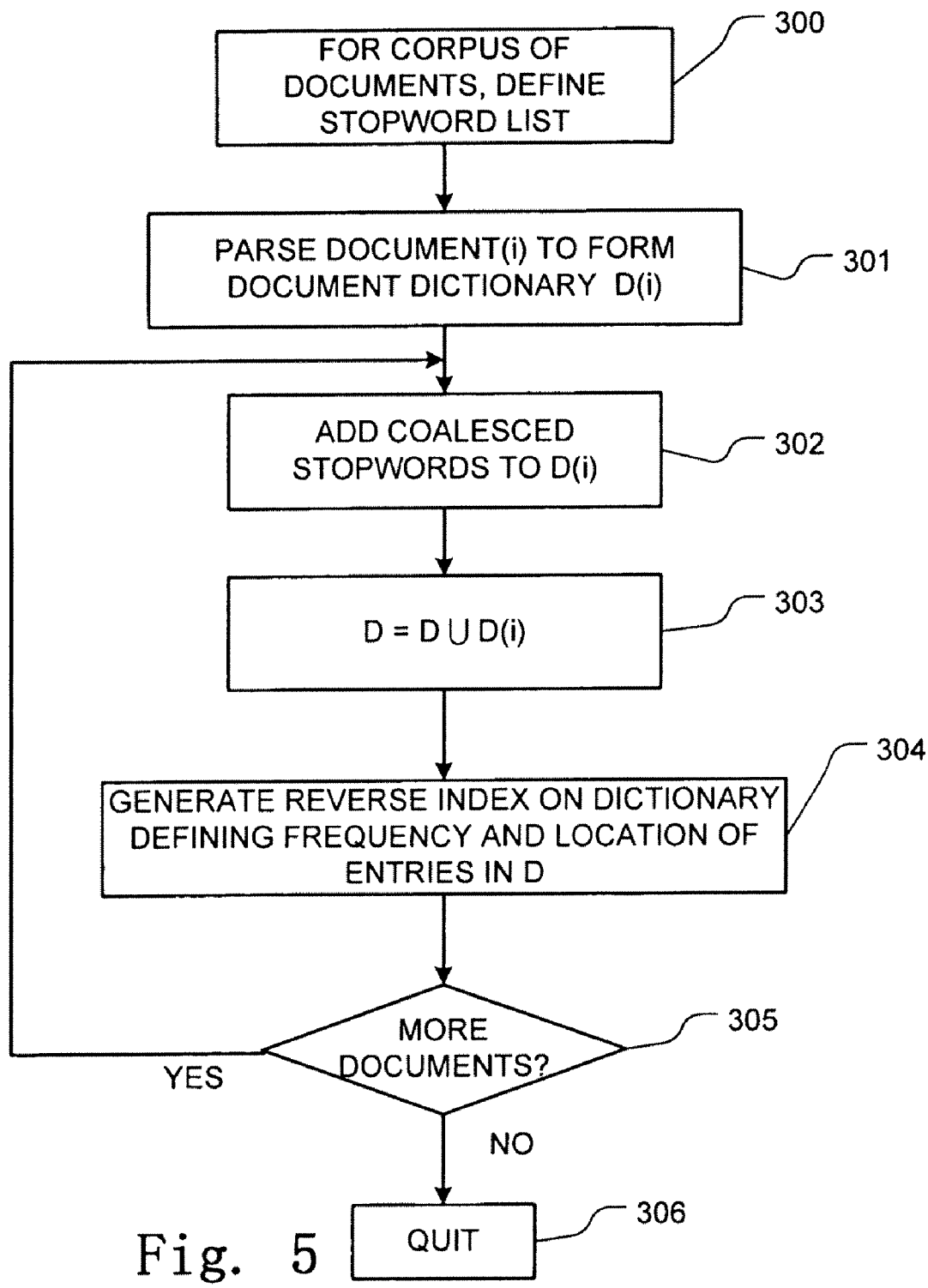
FIG. 5 is a simplified flow chart for an index processor.

Basic processing steps executed by such an index processor are illustrated in FIG. 5. As indicated by step 300, a stopword list is stored for a corpus of documents. The stopword list as mentioned above can be defined based on linguistic analysis for each language subject of the index processor. Alternatively, the stopword list can be generated by analysis of the corpus of documents. Also, a combination of linguistic analysis and document analysis may be applied for generation of the stopword list. In the illustrated example, the index processor parses each document (DOCUMENT (i)) to form a document dictionary D(i) (block 301). Next, entries comprising tokens coalesced with stopwords as described above are added to the document dictionary D(i) (block 302). The dictionary D for the corpus is updated by the union of the set of words in the corpus dictionary D with the set of words in the document dictionary D(i) (block 303). The set of words in the corpus dictionary D can be an empty set at the beginning of an analysis, or may comprise a large number of words determined from analysis of previous documents. The index processor then generates, or updates in the case of adding documents to an existing document dictionary, a reverse index on the dictionary defining the frequency and location of the words corresponding to the entries in the corpus dictionary D (block 304). The processor then determines whether there are more documents to be analyzed (block 305). If there are more documents, then the process loops to step 301, and parses and analyzes the next document. If there are no more documents for analysis at step 305, the indexing processor stops (block 306). It will be appreciated that the order and grouping of the execution of the processing steps shown in FIG. 5 can be rearranged according to the needs of particular implementation.

The basic indexing procedure corresponding with steps 301 and 302 can be understood with reference to the following pseudo-code:

```
Indexing (Document D)
{
    FOR EACH word W IN Document D
    {
        IF (W is a stopword) THEN
        {
            Read first character of word W+1 into C
            Artificial Word W' = Concatenate W and C
            Store W' in index structure
            Store W in index structure
        }
        ELSE
        {
            Store W in index structure
        }
    }
}
```

The above pseudo-code describes a process that operates on words parsed from a document. For each word W, the process determines whether the word is found in the stopword list. If the word is a stopword, then the first character of the following word (W+1) is stored as parameter C. Then, the artificial word W' is created by concatenating the word W with C. The token representing the artificial word W' is then stored in the index structure. Next, the token representing the word W is also stored in the index structure. Not stated in the pseudo-code is a step of associating with the index structure, the artificial word W' with the location of the corresponding stopword W. The location information is associated with words and artificial words using data structures which are part of the index structure, and can be general, such as a document identifier in which the corresponding stopword W is found, or can be more specific, such as a specific word position in a specific line within a specific document. The format of data structure used in the index structure to associate the location information with the corresponding stopword W, and with the artificial word W', association can take many styles known in the computer programming art.

A query processor in the search engine which comprises data sets, such as stopword lists, data structures such as reverse index structures, and computer instructions executable by a processing unit, analyzes a query and generates a modified query if the phrase query includes a stopword, and then executes the modified query and returns results.

Figure 6:
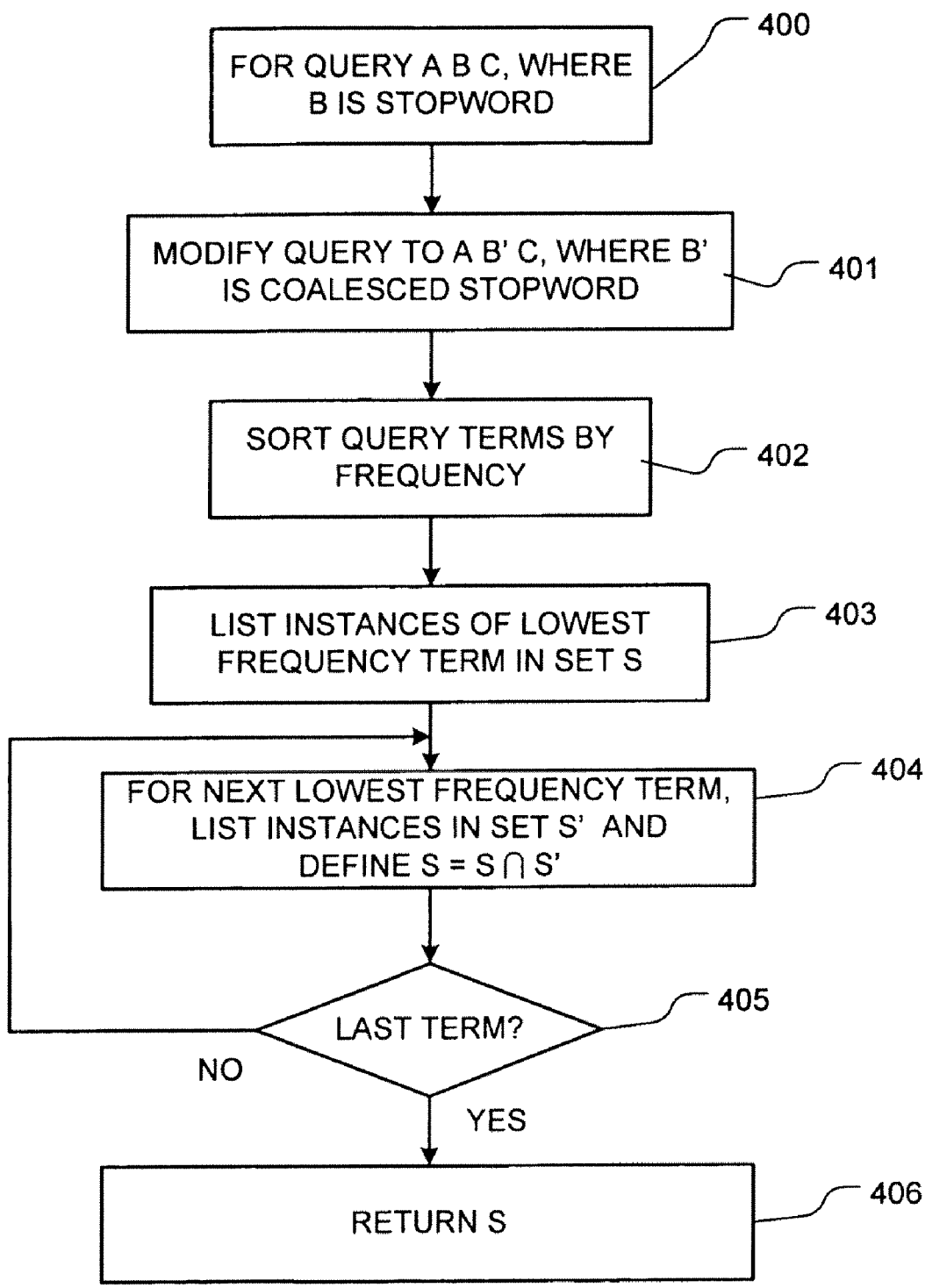
FIG. 6 is a simplified flow chart for a query processor.

Basic processing steps executed by such a query processor are illustrated in FIG. 6. The query processor begins with an input phrase query "A B C", where for this example the word B is a stopword (block 400). Next, the query is modified to the form "A B' C" where the term B' is a search token for matching with the token in the index based on a coalesced stopword as described above (block 401). The query processor may then sort the query terms by frequency in the document corpus based on analysis of the dictionary (block 402). Next, instances of the lowest frequency term in the corpus are listed in a set of instances S (block 403). Then for a next term in the query, instances in the corpus are listed in a set S', and the lists are merged, so that the set of instances S is defined as the intersection of the set S and the set S' (block 404). The processor then determines whether the last term in a query has been processed (block 405). If there are additional terms in the query to be processed, then the processor loops back to block 404 where a list of instances for the next term is generated and merged with the set S. If at block 405 there are no more terms to be analyzed in the query, then the set S is returned as the result of the query (block 406).

At query time, if the phrase query contains stopwords, the query is preprocessed and the stopwords are converted into their corresponding artificial tokens, corresponding with blocks 400 and 401 of FIG. 6. This process can be understood with reference to the following pseudo-code:

```
Process Query (Phrase Query Q)
{
    IF (Q contains stopwords) THEN
    {
        FOR EACH stopword W IN Q
        {
            Read first character of word W+1 into C
            Artificial Word W' = Concatenate W and C
            Replace W with W' in Q
        }
    }
    Process Phrase Query (Q)
}
```

The above query processing pseudo-code describes a process which operates on queries received by the search engine. For each query Q, the process determines whether it contains a stopword. If it contains a stopword, then for each stopword W in the query Q, the first character of the next word W+1 in the query is stored as a parameter C. Then, an artificial token W' is created by concatenating W with the parameter C. The artificial token W' is used in the query in place of, or in addition to, the stopword W. Finally, the query as modified is processed.

Technology described above comprises the following computer implemented components:
1. A list of all stopwords identified by the system.
2. An algorithm during indexing that coalesces stopwords with the first characters of the subsequent words and stores these as artificial tokens in the search index.
3. An algorithm at query time, for phrase queries only, that checks if any stopwords are contained in the query. If yes, such stopwords are changed to the corresponding artificial tokens and the query is executed normally.
4. Processes for returning results correctly.

The invention consists of a mechanism for significantly speeding up phrase queries involving frequently occurring words in a search engine. Prior techniques have tried to solve this issue by coalescing stopwords and the words following them as a logical unit. These techniques, while significantly speeding up phrase queries, also increase the number of unique words in a search index. The proposed solution coalesces the stopwords in a novel way that significantly speeds up evaluation of phrase queries containing stopwords, while simultaneously reducing the number of unique words.

The various optimizations related to the number of prefix characters in the actual word and to adapting automatically to the best number of and even a variable number of prefix characters can be applied.

While the present invention is disclosed by reference to the preferred embodiments and examples detailed above, it is to be understood that these examples are intended in an illustrative rather than in a limiting sense. It is contemplated that modifications and combinations will readily occur to those skilled in the. art, which modifications and combinations will be within the spirit of the invention and the scope of the following claims.

What is claimed is:

1. An article of manufacture for use with a data processor for finding information in a corpus of documents, wherein words in the corpus of documents include a set of stopwords, comprising:
   a machine readable data storage medium including executable instructions to:
   identify stopwords in the corpus of documents;
   form abnormal words, each abnormal word including a stop word and a character of a word adjacent to the stopword, such that each abnormal word includes a complete word and an incomplete word;
   define a dictionary including stopwords, unique words and abnormal words associated with the corpus of documents;
   form an abnormal query word with a stopword and a character of a word adjacent to the stopword in a query;
   apply the abnormal query word to the dictionary to identify a match.

2. The article of manufacture of claim 1 further comprising executable instructions to locate a pointer associated with the match.

3. The article of manufacture of claim 2 further comprising executable instructions to follow the pointer to an inverted index.

4. The article of manufacture of claim 3 further comprising executable instructions to process document identification information and word location information in the inverted index.

5. The article of manufacture of claim 4 further comprising executable instructions to supply documents responsive to the query.

6. The article of manufacture of claim 5 further comprising executable instructions to supply word location information in documents responsive to the query.

7. The article of manufacture of claim 1 wherein an abnormal word includes a stop word and N leading characters of a subsequent word.

8. The article of manufacture of claim 7 wherein N is 3 or less.

9. The article of manufacture of claim 7 wherein N is 1.

10. The article of manufacture of claim 1 wherein a stopword is a special character.

11. The article of manufacture of claim 1 wherein the stopwords include: "the", "of", "and", "a", "is", and "in".

* * * * *